(12) United States Patent
Dowty

(10) Patent No.: US 7,029,215 B2
(45) Date of Patent: Apr. 18, 2006

(54) DUAL TRACK FITTING

(75) Inventor: Mark Brian Dowty, Rural Hall, NC (US)

(73) Assignee: BE Aerospace, Inc., Wellington, FL (US)

( * ) Notice: Subject to any disclaimer, the term of this patent is extended or adjusted under 35 U.S.C. 154(b) by 103 days.

(21) Appl. No.: 10/866,288

(22) Filed: Jun. 11, 2004

(65) Prior Publication Data

US 2005/0180836 A1    Aug. 18, 2005

Related U.S. Application Data

(63) Continuation-in-part of application No. 10/779,061, filed on Feb. 13, 2004, now Pat. No. 6,902,365.

(51) Int. Cl.
*B60P 7/08* (2006.01)

(52) U.S. Cl. .................. 410/105; 410/104; 410/102

(58) Field of Classification Search .............. 410/102, 410/104, 105, 116; 248/503.1, 503; 244/118.1, 244/118.6, 122 R, 137.1
See application file for complete search history.

(56) References Cited

U.S. PATENT DOCUMENTS

| 3,282,229 | A | | 11/1966 | Elsner |
| 3,620,171 | A | | 11/1971 | Brenia et al. |
| 3,719,156 | A | | 3/1973 | Broling |
| 4,026,218 | A | | 5/1977 | Prete, Jr. et al. |
| 4,062,298 | A | | 12/1977 | Weik |
| 4,230,432 | A | | 10/1980 | Howell |
| 4,509,888 | A | | 4/1985 | Sheek |
| 4,708,549 | A | | 11/1987 | Jensen |
| 4,776,533 | A | | 10/1988 | Sheek et al. |
| 4,932,816 | A | * | 6/1990 | Ligensa .................. 410/105 |
| 5,169,091 | A | | 12/1992 | Beroth |
| 5,183,313 | A | | 2/1993 | Cunningham |
| 5,489,172 | A | * | 2/1996 | Michler .................. 410/105 |
| 5,564,654 | A | | 10/1996 | Nordstrom |
| 5,871,318 | A | | 2/1999 | Dixon et al. |
| 6,902,365 | B1 | * | 6/2005 | Dowty .................... 410/105 |

\* cited by examiner

*Primary Examiner*—Stephen Gordon
(74) *Attorney, Agent, or Firm*—Adams Evans P.A.

(57) ABSTRACT

A track fastener assembly for securing a seat or cargo apparatus to a floor track of a vehicle. The assembly includes a bottom rail with forward and aft ends. Front and rear movable slides carrying locking studs are carried by the bottom rail. A locking rod having a helical groove formed in its outer surface is operatively connected to the bottom rail and the slides. Rotation of the locking rod causes the slides to move axially from an installation position to a locking position. As the slides move to the locking position, they are deflected upwards along with the attached locking studs, clamping the track fastener assembly to the track.

27 Claims, 12 Drawing Sheets

DUAL TRACK FITTING

This application is a continuation-in-part of application 10/779,061 filed on Feb. 13, 2004 and issued as U.S. Pat. No. 6,902,365 on Jun. 7, 2005.

TECHNICAL FIELD AND BACKGROUND OF THE INVENTION

This invention relates to a track fastener assembly of the type used to anchor seats or cargo to tracks fitted to the floor of a vehicle. The particular embodiment disclosed herein is of a track fastener assembly for securing an aircraft passenger seating unit to the floor of an aircraft. Therefore the vehicle referred to throughout this application is an aircraft. It is understood that the invention relates as well to other types of vehicles such as trains, buses or the like.

Many aircraft require the capability to be differently configured to meet varying cargo and/or passenger-carrying requirements such as the removal or addition of passenger seats and/or cargo. In addition, aircraft also must have the capability to easily and quickly relocate or reposition seats and/or cargo. It is often necessary in aircraft to change the spacing between seats to increase or decrease the passenger density throughout a portion of or the entire aircraft. For example, it may be necessary to change the passenger density of a particular aircraft from its normal first class and coach density to an all-coach configuration such as might be necessary with charter operations. In addition, some aircraft, particularly those operating on late-night schedules, carry both passengers and cargo, the cargo being carried in one or more compartments normally used to carry passengers. Also driving this design is the need of aircraft manufacturers to speed their initial installation time, which is a major consideration on large aircraft with many seats.

To provide this capability, aircraft manufacturers install locking tracks that run fore and aft along the deck of the major compartments of the aircraft. These locking tracks have a slot that runs the entire length of the track along its top side. Enlarged cut-out openings are spaced at regular intervals along the length of the track to receive portions of various types of track fasteners to permit the track fasteners to be positioned along and locked into the track in order to secure passenger seats and/or cargo pallets which are themselves secured to the track fastener. These track fasteners are adjustable within the track, thereby permitting the seats and/or cargo to be repositioned or removed.

The tracks and track fasteners are designed with safety as a paramount concern. A seat or cargo container which is not securely locked into the track is subject to sudden movement which can cause injury, structural damage to the aircraft or a substantial change in aircraft balance. The track assembly must be able to safely distribute the load to the track so that an load is not transmitted through only a few load distribution points in a manner that would cause an unsafe condition. Any track fastener should also be capable of being easily installed on and removed from the locking track so the seats and/or cargo can be repositioned or removed quickly, safely and with minimal effort.

Some seat units, especially first-class seat units, have become larger and heavier in an effort to incorporate additional passenger features such as complex reclining or sleeping surfaces, in flight entertainment, work surfaces, and heavily padded upholstery. With most of prior art track fasteners, the entire fastener must be moved along with the entire attached seating unit in order to engage it in the locking position of the track. This is difficult with large and heavy seat units. Furthermore, a slight misalignment of the seat tracks or legs can make the seat difficult to move in the tracks, especially in seats having more than two legs.

Accordingly efforts have been made to provide a seat track fastener in which only the locking elements are moved in order to lock the seat to the track, without having to move the entire seat. For example, U.S. Pat. No. 5,489,172 discloses a fastening device in which a locking body which engages a track is moveable relative to the body of the fastening device such that the seat or cargo unit may be locked into place without having to shift it after it is initially positioned. However, this design is operated by a hand lever which protrudes a substantial amount vertically or horizontally from the track fitting, and the motion of the lever must be accommodated in the design of the seat.

Because seat units often have extensive exterior structure or skirting which restricts access to the mounting points, it is desirable to have a track fastener which is easily operated without requiring substantial vertical or horizontal space outside of the volume of the fastener.

SUMMARY OF THE INVENTION

Therefore, it is an object of the invention to provide a track fastener assembly for a vehicle such as an aircraft, train, bus or the like.

It is an object of the invention to provide a track fastener assembly which is quickly and easily locked and unlocked when necessary to reposition the fastener.

It is another object of the invention to provide a track fastener assembly which is capable of being connected to a locking track quickly, safely and securely.

It is another object of the invention to provide a track fastener assembly which does not require repositioning of an attached seat in order to be locked in place.

It is another object of the invention to provide a track fastener assembly which requires a minimal amount of access space to be locked and unlocked.

These and other objects of the present invention are achieved in the preferred embodiments disclosed below by providing a track fastener assembly for use with a locking track of the type used to secure a seat or cargo apparatus to the floor of a vehicle, the upper walls of the locking track defining a longitudinally-extending slot therein, the upper walls of the slot having regularly spaced-apart enlarged openings along the length thereof separated by relatively narrower track segments defining locking segments. The track fastener assembly include an elongated bottom rail having forward and aft ends, and an axially-extending slide channel disposed at the aft end; an elongated base having forward and aft ends and including attachment means for attachment to the aft end of the bottom rail. The base has a longitudinal slot formed therein, at least one ramp disposed on an upper surface of the base adjacent a forward end of the longitudinal slot, and at least one downwardly-protruding track stop for engaging the enlarged openings of the track. A rear slide is movably attached to the base, the rear slide including a first rail received in the longitudinal slot of the base and carrying at least one downwardly-protruding locking stud for engaging the track. A front slide is slidably received in the slide channel, the front slide including a second rail received in the slide channel of the base and carrying at least one additional downwardly-protruding locking stud for engaging the track. A generally horizontally extending locking rod having at least one helical groove formed in its outer surface is locking rod being operatively connected to the bottom rail, the base, and the front and rear slides, such that rotation of the locking rod causes the front and rear slides and the locking studs to move longitudinally from an installation position to a locked position spaced away from the installation position.

According to another aspect of the invention, each of the front and rear slides includes at least one pin which engages the helical groove of the locking rod for imparting horizontal movement to respective front and rear slides as the locking rod is rotated.

According to another aspect of the invention, the locking rod may freely rotate and move vertically with respect to the base, but is restrained laterally and longitudinally relative to the base.

According to another aspect of the invention, the helical groove is formed in the locking rod to move the front and rear slides between the installation position and the locked position in less than 360 degrees of rotation of the locking rod.

According to another aspect of the invention, an eccentric rear locking disk is attached to an aft end of the locking rod, such that rotation of the locking rod causes a peripheral edge of the rear locking disk to bear against the base and lift the locking rod and the rear slide away from the base.

According to another aspect of the invention, the rear locking disk includes a first locking flat disposed on the peripheral edge for engaging a surface of the base, such that rotation of the locking rod is resisted.

According to another aspect of the invention, the first locking flat is positioned such that the first locking flat engages the base after approximately 180 degrees of rotation of the locking rod from the installation position.

According to another aspect of the invention, an eccentric front locking disk is attached to a forward end of the locking rod, such that rotation of the locking rod causes a peripheral edge of the front locking disk to bear against a boss disposed on the bottom rail and lift the locking rod and the front slide upwards relative to the bottom rail.

According to another aspect of the invention, the front locking disk includes a second locking flat disposed on the peripheral edge for engaging the boss, such that rotation of the locking rod is resisted.

According to another aspect of the invention, the second locking flat is positioned such that the second locking flat engages the base after approximately 180 degrees of rotation of the locking rod from the installation position.

According to another aspect of the invention, the helical groove is formed in the locking rod to move the front and rear slides between the installation position and the locked position in approximately 180 degrees of rotation of the locking rod.

According to another aspect of the invention, the first and second rails of the front and rear slides each include a pair of tapered surfaces flanked by a pair of angled shoulders, the longitudinal slot includes a pair of sidewalls tapered opposite to the tapered surfaces of the first rail, and a beveled ledge, the slide channel includes a pair of sidewalls tapered opposite to the tapered surfaces of the second rail, and a beveled ledge. The angled shoulders of the first rail mate with the beveled ledge of the longitudinal slot, and a gap is formed between the tapered surfaces of the first rail and the sidewalls of the longitudinal slot, so as to permit limited rotation of the rear slide relative to the base. The angled shoulders of the second rail mate with the beveled ledge of the slide channel, and a gap is formed between the tapered surfaces of the second rail and the sidewalls of the slide channel, so as to permit limited rotation of the front slide relative to the bottom rail.

According to another aspect of the invention, a track fastener assembly is provided for use with a locking track of the type used to secure a seat or cargo apparatus to the floor of a vehicle, the upper walls of the locking track defining a longitudinally-extending slot therein, the upper walls of the slot having regularly spaced-apart enlarged openings along the length thereof separated by relatively narrower track segments defining locking segments. The track fastener assembly includes an elongated bottom rail having forward and aft ends, and an axially-extending slide channel disposed at the aft end; an elongated base having forward and aft ends and including attachment means for attachment to a seat or cargo apparatus, the base having a longitudinal slot formed therein, at least one ramp disposed on an upper surface of the base adjacent a forward end of the longitudinal slot, and at least one downwardly-protruding track stop for engaging the enlarged openings of the track. A rear slide is movably attached to the base, the rear slide including a bottom portion defining a first rail which is received in the longitudinal slot of the base, a pair of shoulders adjacent the rail, and an upper surface defining a first channel for receiving a locking rod.

A front slide is movably attached to the bottom rail, the front slide including a bottom portion defining a second rail which is received in the longitudinal slot of the base, a pair of shoulders adjacent the rail, and an upper surface defining a second channel for receiving a locking rod. At least one upstanding pin is disposed in each of the first and second channels, and at least one locking stud having an enlarged head is attached to the first rail of the rear slide. At least one additional locking stud having an enlarged head is attached to the second rail of the front slide. A cylindrical locking rod having forward and aft ends and at least one helical groove formed in its outer surface is received in the channels of the front and rear slides such that the helical groove engages the pins in the first and second channels. The locking rod is rotatably attached to the base and the bottom rail. Rotation of the locking rod causes the front and rear slides and the attached locking studs to move axially from an installation position to a locked position spaced away from installation position, and wherein the shoulders of the rear slide engage the ramps thereby deflecting the rear slide upwards in the locked position.

According to another aspect of the invention, the locking rod includes a tool recess formed in one of the forward and aft ends thereof for engaging a tool for rotating the locking rod.

According to another aspect of the invention, the track stop comprises a cylindrical protrusion.

According to another aspect of the invention, the helical groove is formed in the locking rod to move the front and rear slides between the installation position and the locked position in less than 360 degrees of rotation of the locking rod.

According to another aspect of the invention, the helical groove is formed in the locking rod to move the front and rear slides between the installation position and the locked position in less than 360 degrees of rotation of the locking rod.

According to another aspect of the invention, the attachment means comprises a pair of upstanding spaced-apart bosses having a pair of aligned openings formed therein, and the bosses include a pair of flanges defining a vertical slot therebetween.

According to another aspect of the invention, the locking rod has an annular groove formed near its forward end, the groove being received in the vertical slot between the bosses whereby the locking rod may freely rotate and move vertically with respect to the base, but is restrained laterally and longitudinally relative to the base.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
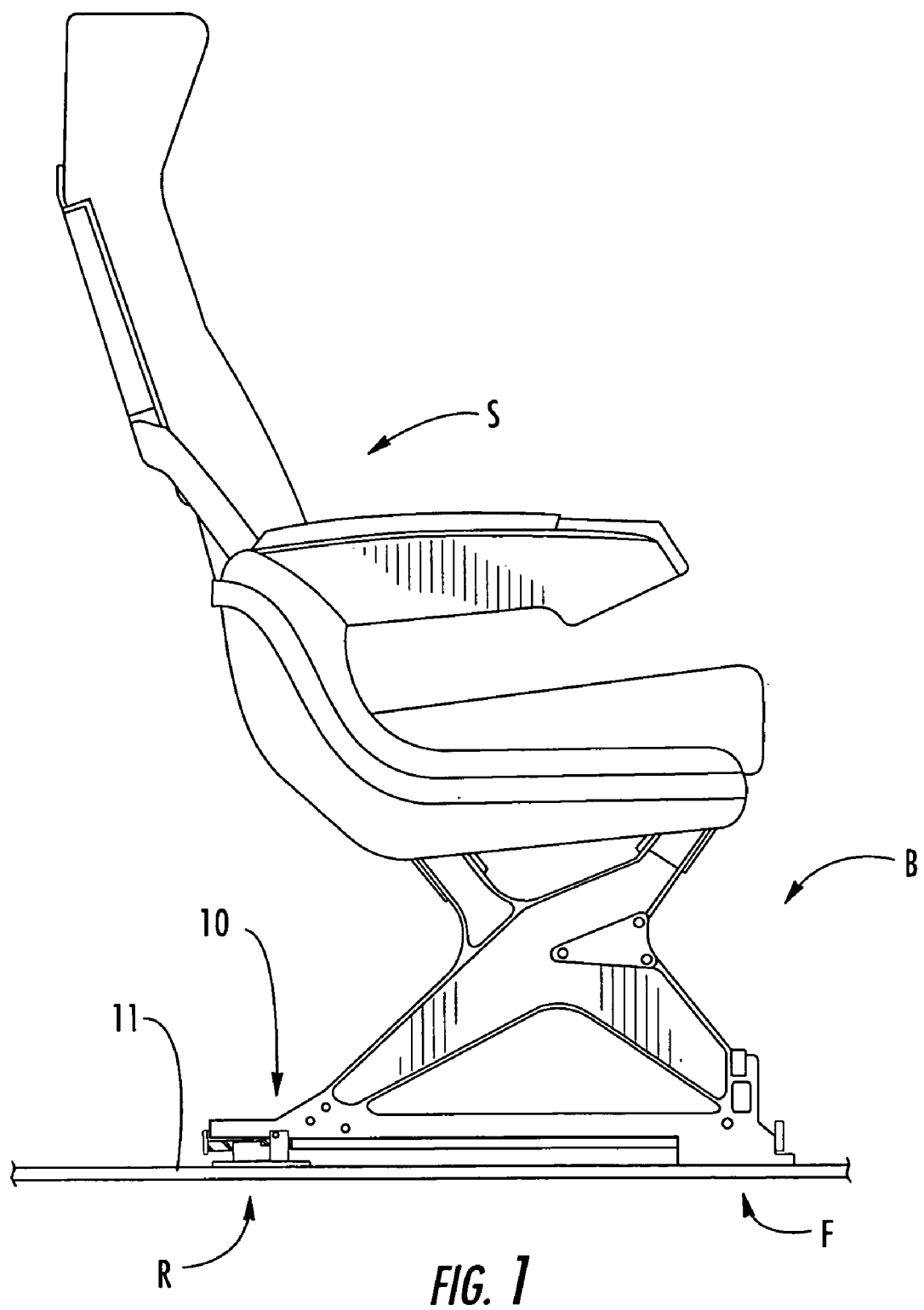
FIG. 1 is a side elevation of a typical aircraft passenger seat attached to a track fastener assembly according to an embodiment of the invention.

Referring now specifically to the drawings wherein identical reference numerals denote the same elements throughout the various views, a typical seating arrangement using the track fastener assembly and track fastener assembly according to the present invention is illustrated in FIG. 1. A seating unit "S" having a base frame "B" is positioned on a locking track 11 and locked thereto by means of a track fastener assembly 10 having a rear portion "R" and a forward portion "F".

Figure 2:
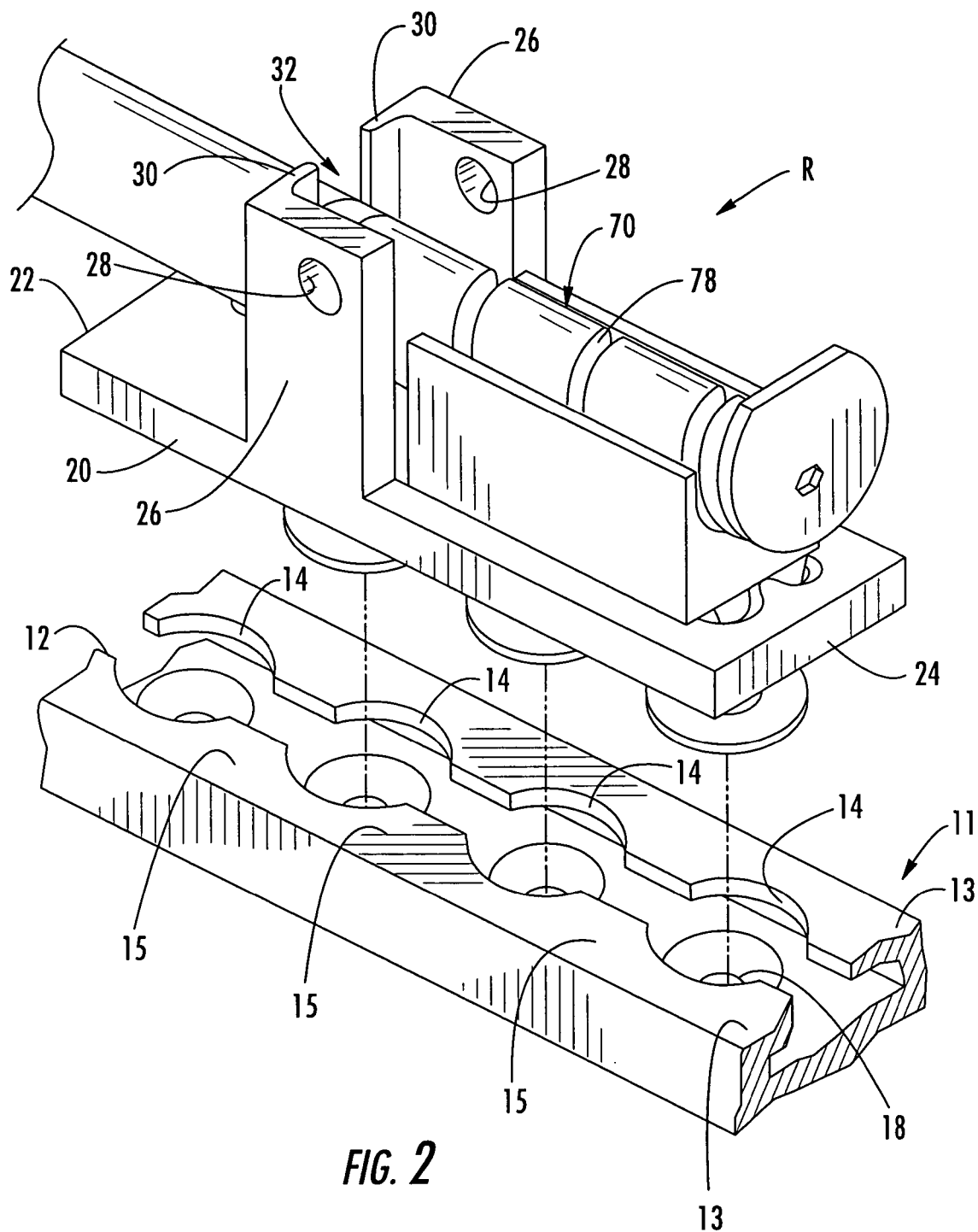
FIG. 2 is a perspective view of a portion of a track fastener assembly constructed according to the present invention positioned over a length of locking track of a type usable with the invention.

Referring now to FIG. 2, locking track 11 has a longitudinally-extending slot 12 therein which extends along the entire length of the locking track 11. Upper walls 13 of the locking track 11 define the slot 12 having regularly spaced-apart enlarged openings 14 along the length thereof, separated by relatively narrower track slot segments 15 which form the portions of the structure which actually perform the locking function. In FIG. 2 it is evident that the narrow track slot segments 15 extend into the slot 12 to provide undercut areas in the slot 12 beneath the slot segments 15. In contrast, the enlarged openings 14 have little or no undercut areas in the slot 12. The locking track 11 is attached to the floor of the aircraft, for example by machine screws which pass through screw holes 18 in the bottom of locking track 11.

An exemplary embodiment of the rear portion R of the track fastener assembly 10 is shown in FIGS. 2–5. The rear portion R includes an elongated base 20 with forward and aft ends 22 and 24. It is noted that the terms "forward" and "aft" are used herein merely for the purpose of orientation and that the track fastener assembly 10 may be installed with either of its ends facing forward relative to the track 11. The base 20 has a pair of upstanding, spaced-apart L-shaped bosses 26. The bosses 26 include integrally-formed attachment means in the form of a pair of aligned apertures 28 (one in each of the bosses 26) for receiving a bolt or other fastener from the base frame B of the seating unit S so that the track fastener assembly 10 and the seating unit S are securely connected together. The bosses 26 also include spaced-apart vertically extending flanges 30 which define a vertical slot 32 therebetween.

Figure 3:
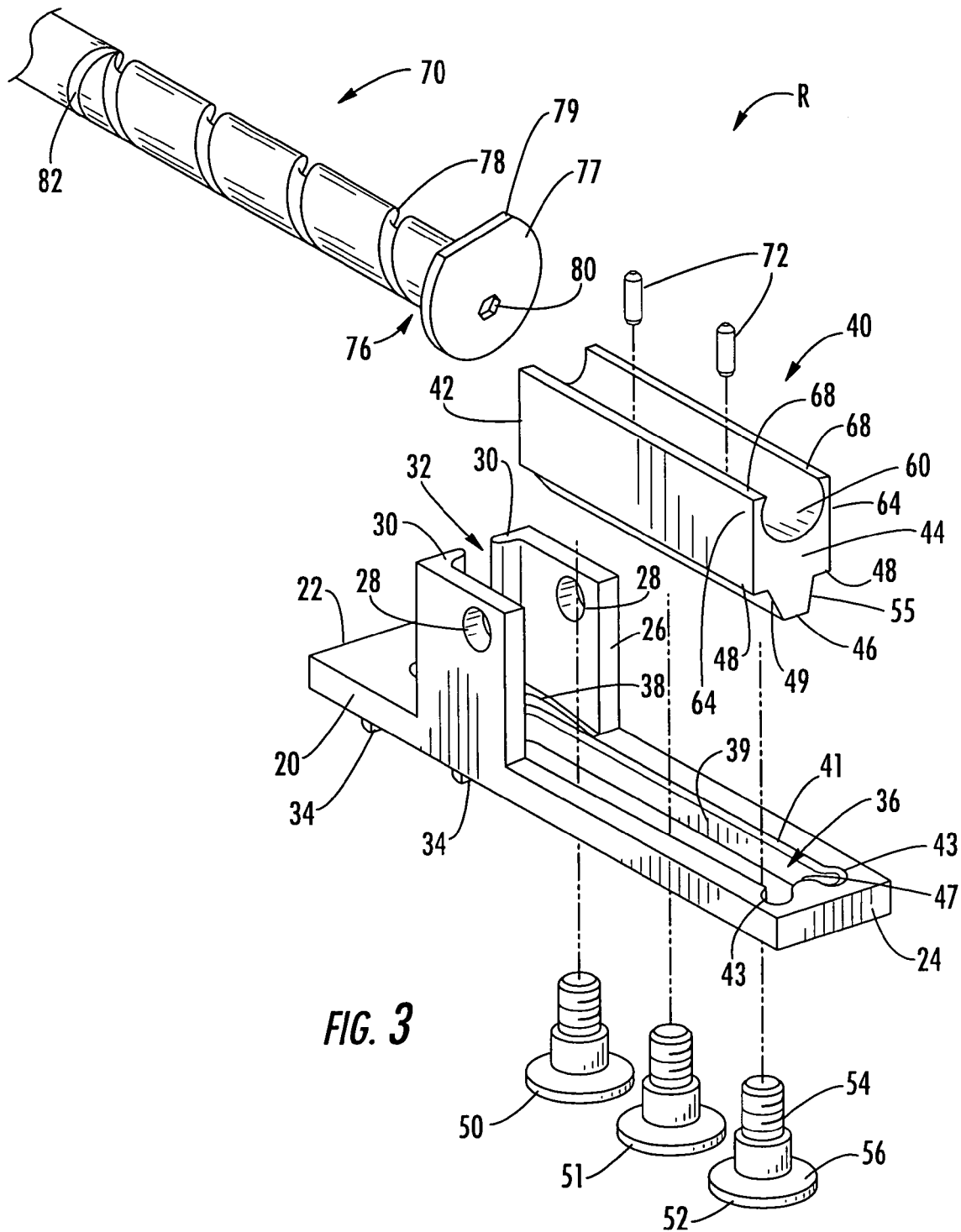
FIG. 3 is an exploded perspective view of the track fastener assembly of FIG. 2.
Figure 4:
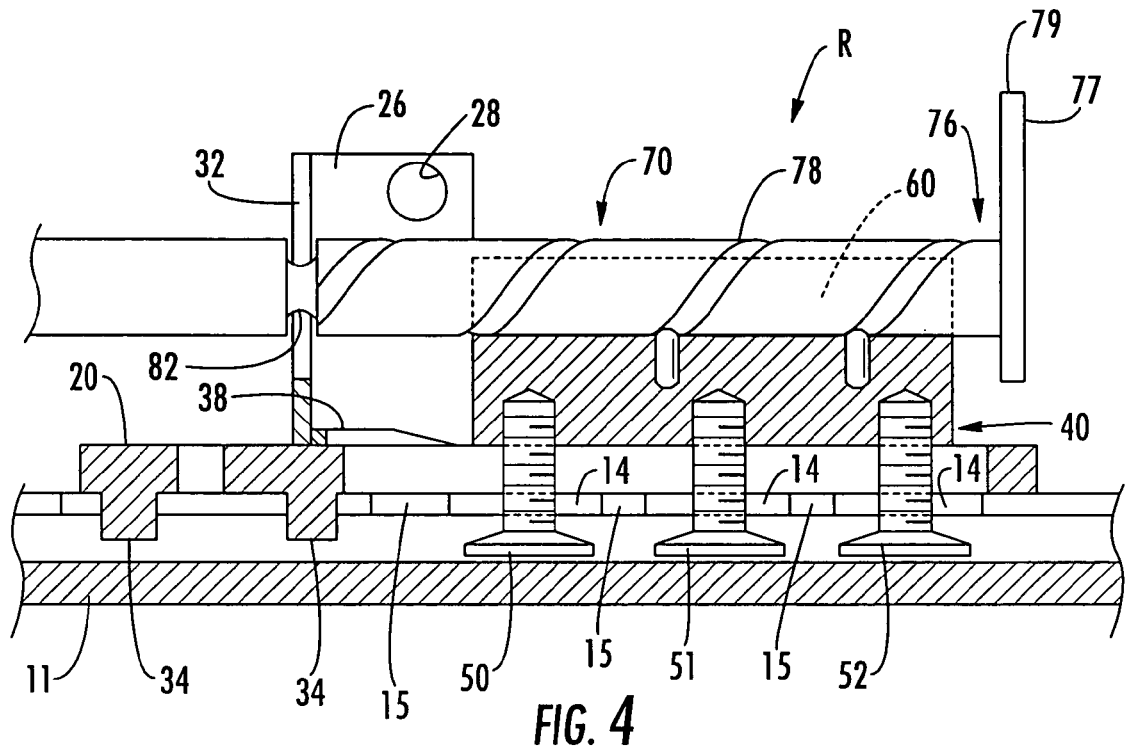
FIG. 4 is a side cross-section view of the track fastener assembly of FIG. 2 disposed in a track in an installation and removal position.
Figure 5:
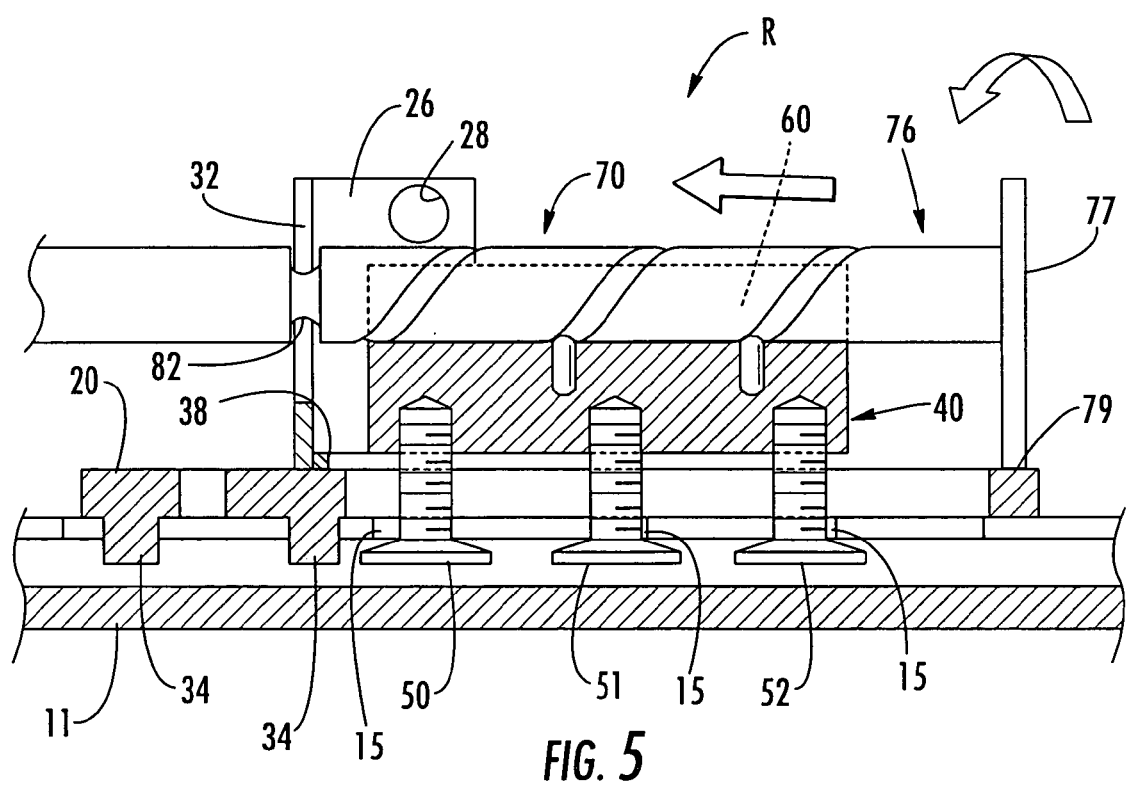
FIG. 5 is a side cross-section view of the track fastener assembly of FIG. 2 disposed in locked position.
Figure 6:
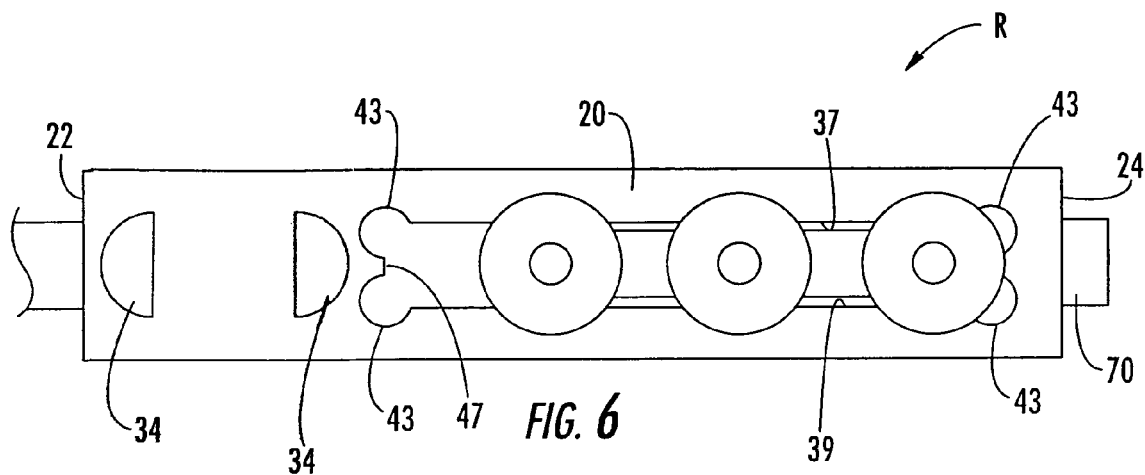
FIG. 6 is a bottom view of a portion of a track fastener assembly according to one embodiment of the invention.
Figure 7:
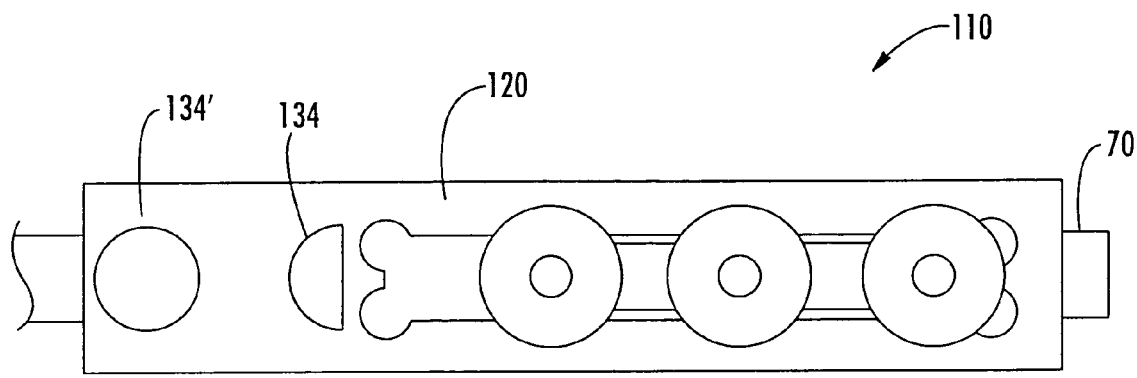
FIG. 7 is a bottom view of a portion of a track fastener assembly showing an alternative arrangement of a track stop.

One or more track stops 34 protrude from the bottom surface of the base 20 (see FIGS. 3, 4, and 5). These track stops 34 are received in the enlarged openings 14 of the track 11 to prevent longitudinal and lateral motion of the base 20 relative to the track 11, as described in more detail below. In the example shown in FIGS. 3–6, the track stops 34 take the form of semi-cylindrical protrusions. However, any other shape which will fit into the enlarged openings may be used. For example, FIG. 7 shows a bottom view of an alterative embodiment of a track fastener assembly 110 having a base 120 with a semi-cylindrical track stop 134 and a fully cylindrical track stop 134'.

An axially-extending longitudinal slot 36 is formed through the base 20. The longitudinal slot 36 has sidewalls 37 and 39 which are tapered outwardly from top to bottom, and includes a beveled ledge 41 around its upper surface (see FIG. 8). The longitudinal slot 36 may have rectangular or radiused ends. However, in the illustrated example (see FIGS. 6 and 7), each of the slot ends have a "dog-bone" shape comprising a pair of relief cuts 43 which define a central pad 47 therebetween. A portion of the upper surface 21 of the base 20 on each side of the longitudinal slot 36 and between the bosses 26 is raised so as to define a ramp 38. A rear slide 40 is disposed in the longitudinal slot 36 of the base 20. The rear slide 40 is a unitary, elongated component having a forward end 42 and an aft end 44.

Figure 8:
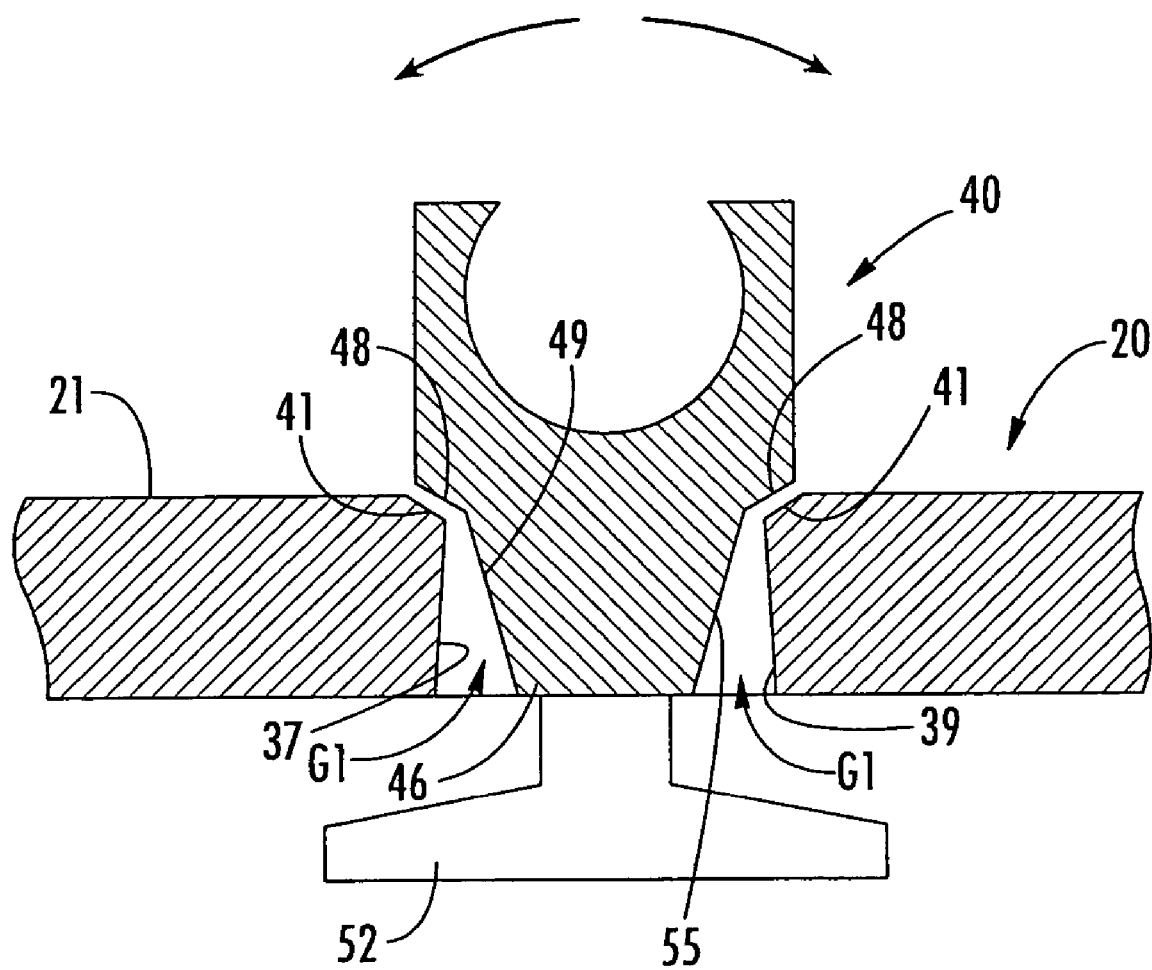
FIG. 8 is a partial cross-sectional end view of a track fastener assembly.

Referring to FIG. 8, the lower portion of the rear slide 40 is formed into an elongated rail 46 having tapered surfaces 49 and 55. The rail 46 is flanked at its upper end by a pair of angled, laterally extending shoulders 48. The rail 46 and the longitudinal slot 36 mate in such a way that the shoulders 48 of the rear slide 40 are roughly parallel to the beveled ledge 41 of the longitudinal slot 36, but the tapered surfaces of the rail 46 and the sidewalls 37 and 39 of the longitudinal slot 36 define an opposing taper, which creates a gap "G1" on either side of the rail 46. The effect is to allow a constrained form of rotation about the approximate center of a locking rod 70 (described below), as depicted by the arrows. In the illustrated example about 10° of rotation is allowed. This rotation accommodates the seat track warpage that occurs during an accident and which is required to be simulated during 16 g crash testing, so that the seats can deflect under crash loads without failing. One or more threaded holes (not shown) are formed in the bottom of the rail 46. These holes receive locking studs 50, 51 and 52, shown in FIG. 3. These locking studs 50, 51, 52 are of a known type and each include a threaded shaft 54 and a circular mushroom head 56.

Referring to FIGS. 3, 4, and 5, the upper portion of the rear slide 40 has a concave, circular profile channel 60 formed therein. The rear slide 40 forms a pair of walls 64 with overhanging lips 68 which receive the locking rod 70 therein. One or more pins 72 are disposed in the upper surface of the channel 60 and serve to engage the locking rod 70.

The locking rod 70 is generally cylindrical with forward and aft ends 74 and 76. Steeply pitched helical grooves 78 and 78' are formed in the outer surface of the locking rod 70 near its aft and forward ends 76 and 74 respectively. A single helical groove extending the entire length of the locking rod could be used instead of two separate grooves. The term "helical" is used herein to mean that the grooves 78 and 78' extend in both the circumferential and longitudinal directions, without necessarily implying a "helix" shape in a purely geometrical sense. An annular groove 82 is formed in the locking rod 70 near its aft end 76 for the purpose of engaging the vertical slot 32 of the base 20, best shown in FIG. 3.

A rear locking disk 77 may be attached to the aft end 76 of the locking rod 70. As shown in FIG. 2, the rear locking disk 77 is generally circular in shape and includes a locking flat 79. The rear locking disk 77 is mounted to the locking rod 70 in an eccentric, upward-offset position. A tool recess 80 is formed in locking disk. The tool recess 80 is appropriately shaped to receive a tool for turning the locking rod 70 and the rear locking disk 77. For example, it may be a hexagonal shape for receiving a specialized Allen-type wrench.

Figure 11:
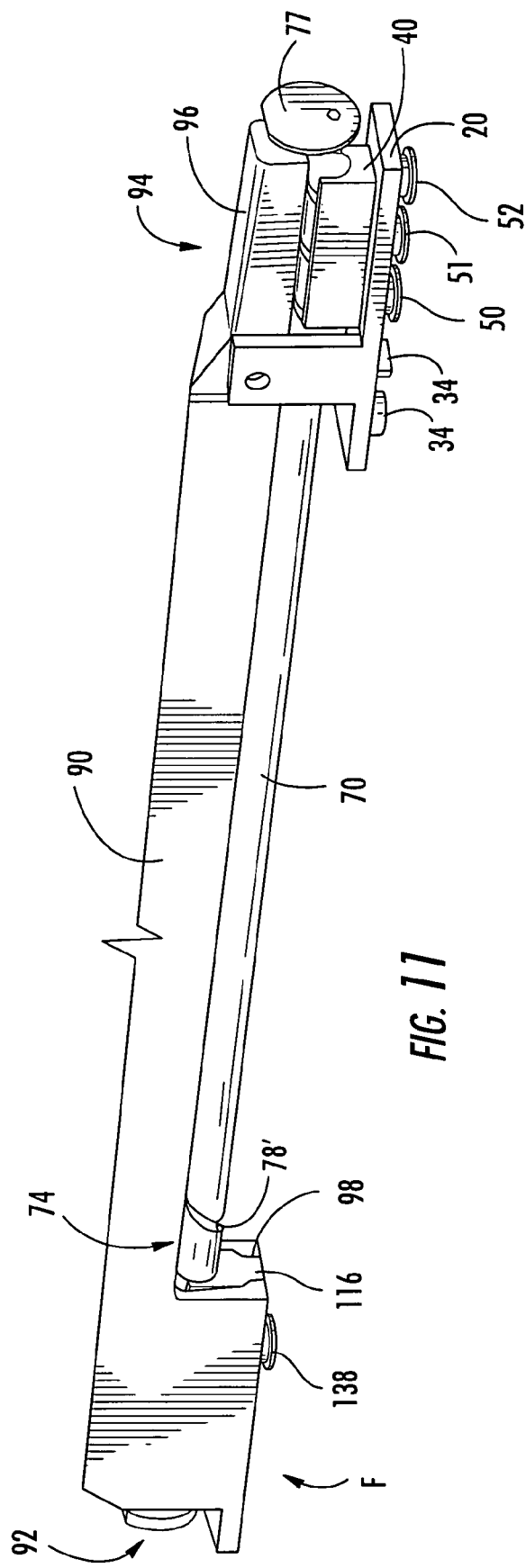
FIG. 11 is a perspective view of a track fastener assembly assembled in a seat frame.
Figure 12:
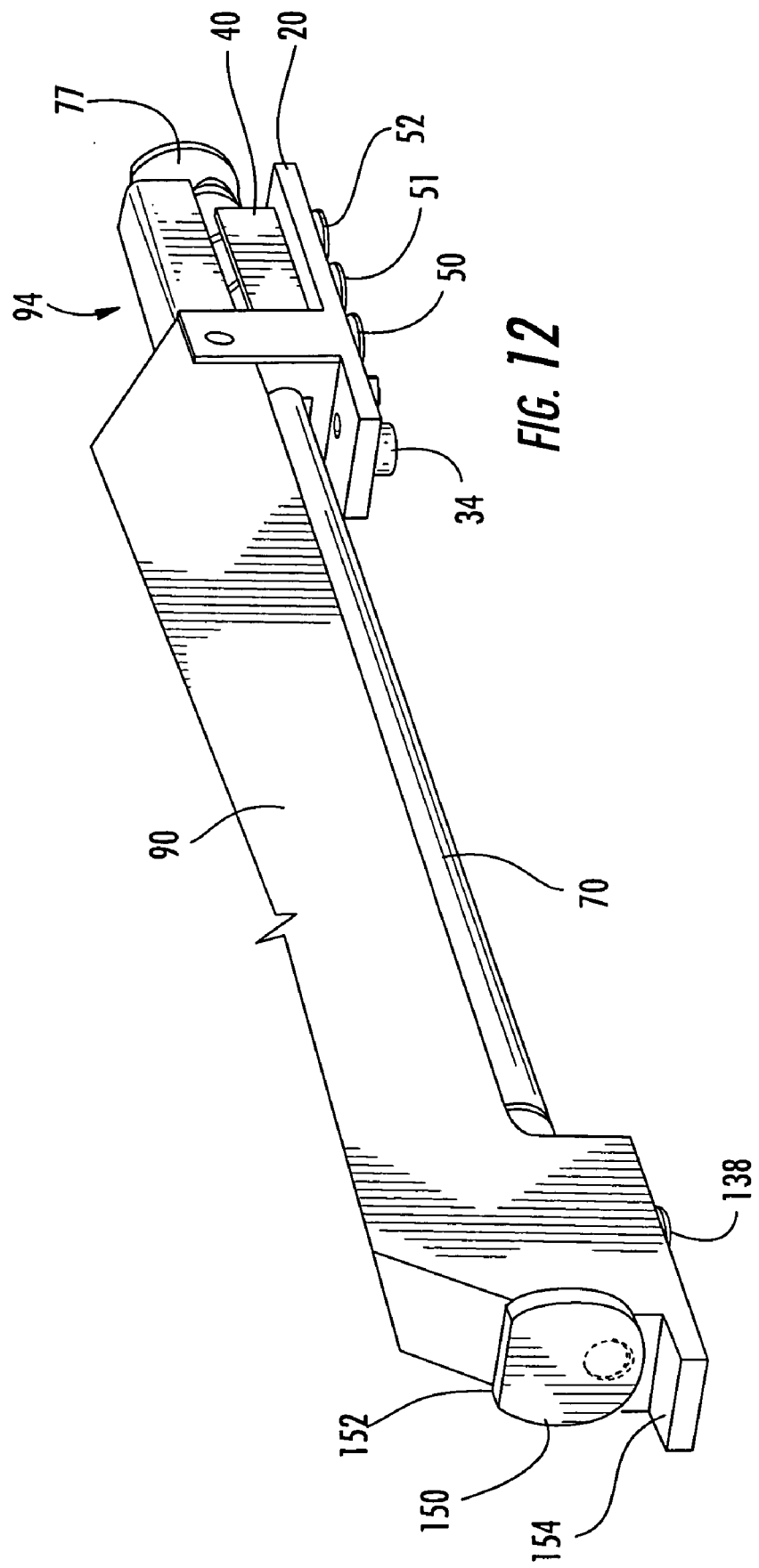
FIG. 12 is another perspective view of the track fastener assembly of FIG. 11.
Figure 13:
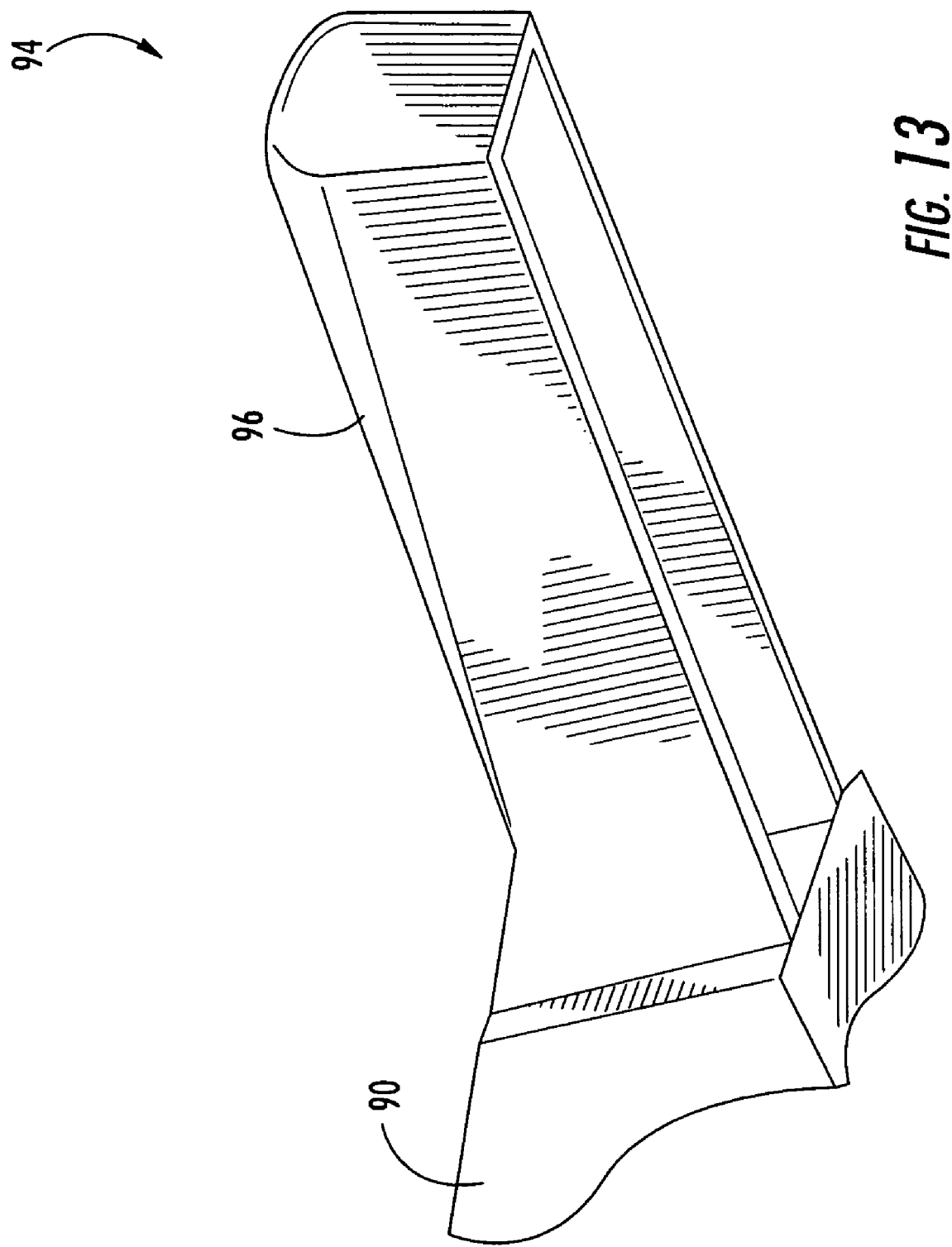
FIG. 13 is a perspective view of a portion of a seat frame.

FIGS. 11 and 12 depict a bottom rail 90 of the seat base frame B shown in FIG. 1. The bottom rail 90 is specially adapted to be used with the track fastener assembly 10 of the present invention. The bottom rail 90 may be integrated with the base frame B as shown or it may be a separate unit attached to the base frame B. The bottom rail 90 has a forward end 92 and an aft end 94. The aft end 94 accepts the base 20, the rear slide 40 and the aft end 76 of the locking rod 70. The base 20 is connected to the bottom rail 90 by fasteners (not shown) which pass through the openings 28 in the bosses 26 of the base 20 and complementary holes (not shown) in the bottom rail 90. The aft end 94 of the bottom rail includes a longitudinally-extending cover 96. The function of this cover 96 is to prevent debris from interfering with the locking rod 70 and to prevent aircraft passengers or crew from contacting the locking rod 70 and other moving parts for safety reasons. As depicted in FIG. 13, the cover 96 is an extension of the bottom rail 90 which is hollow to save weight, however any structure which prevents direct access to the locking rod 70 may be used.

Figure 14:
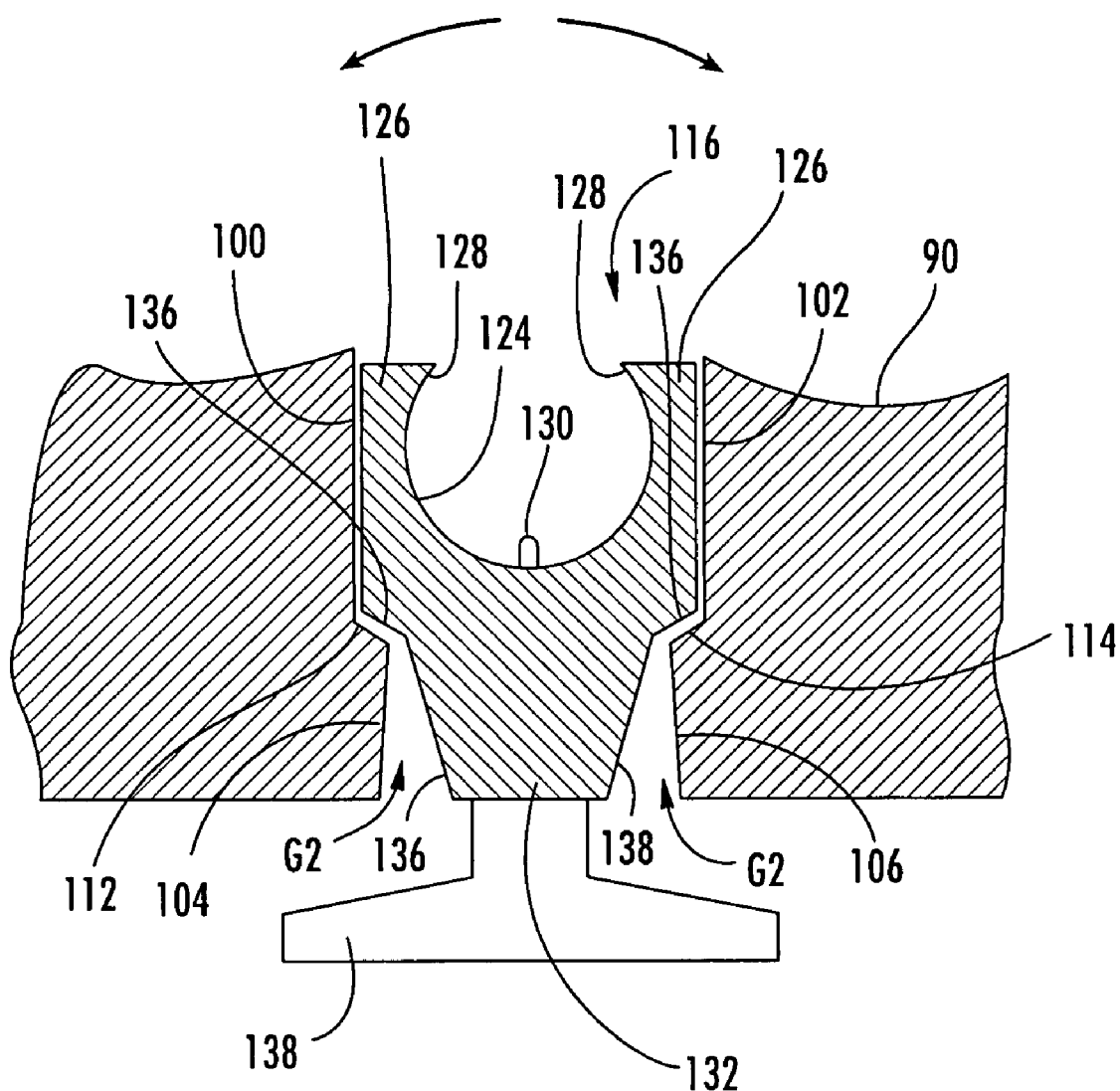
FIG. 14 is a partial cross-sectional end view of a front slide received in a base rail.

An axially-extending slide channel 98 is formed through the forward end 92 of the bottom rail 90. As shown in FIG. 14, the slide channel 98 has parallel upper sidewalls 100 and 102, and lower sidewalls 104 and 106 which are tapered outwardly from top to bottom. Beveled ledges 112 and 114 are formed where the upper and lower sidewalls meet on each side.

Figure 9:
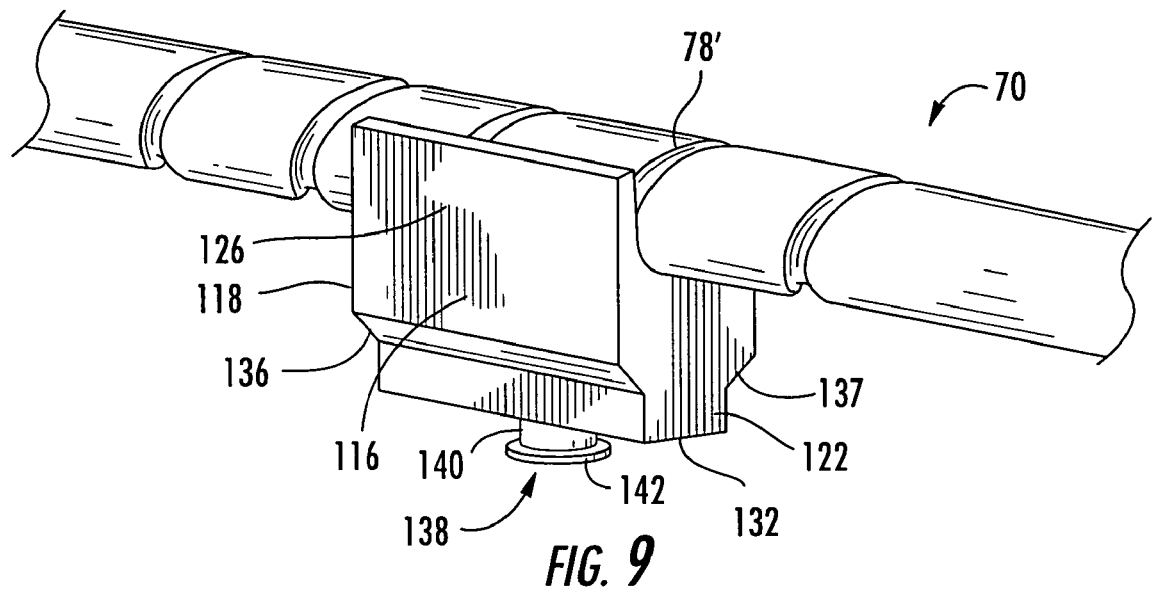
FIG. 9 is a perspective view of a portion of a front slide engaged with a locking rod.
Figure 10:
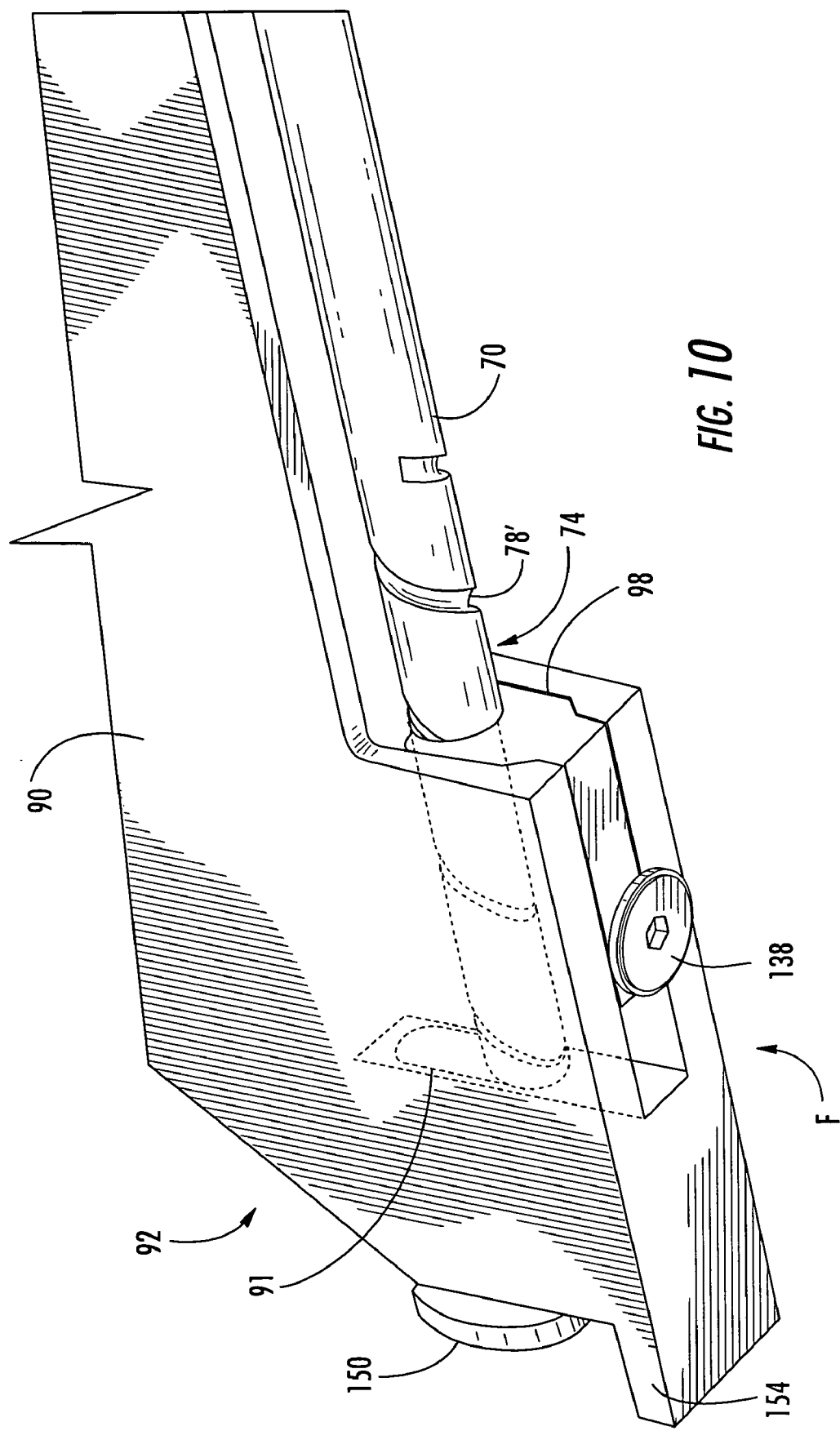
FIG. 10 is a perspective view showing a front slide received in a portion of a seat frame.

FIGS. 9–12 illustrate the forward portion F of the track fastener assembly 10 in more detail. A front slide 116 is disposed in the slide channel 98 of the bottom rail 90. The front slide 116 is a unitary, elongated component having a forward end 118 and an aft end 122. The front slide 116 is shown in FIG. 9 with the bottom rail 90 removed for clarity. The upper portion of the front slide 116 has a concave, circular profile channel 124 formed therein. The front slide 116 forms a pair of walls 126 with overhanging lips 128 which retain the locking rod 70 therein. One or more pins 130, similar to the pins 72 described above, are disposed in the upper surface of the channel 124 and serve to engage the locking rod 70.

The lower portion of the front slide 116 is formed into an elongated rail 132 having tapered surfaces 136 and 137. The rail 132 is flanked at its upper end by a pair of angled, laterally extending shoulders 136. As shown in FIG. 14, the rail 132 and the slide channel 98 mate in such a way that the shoulders 136 of the front slide 116 are roughly parallel to the beveled ledges 112 and 114 of the slide channel 98, but the tapered surfaces of the rail 132 and the lower sidewalls 104 and 106 of the slide channel 98 define an opposing taper, which creates a gap "G2" on either side of the rail 132. The effect is to allow a constrained form of rotation about the approximate center of the locking rod 70, as depicted by the arrows. In the illustrated example about 10° of rotation is allowed. As described above with respect to the rear slide 40, this rotation accommodates the seat track warpage that occurs during an accident and which is required to be simulated during 16 g crash testing, so that the seats can deflect under crash loads without failing. One or more threaded holes (not shown) are formed in the bottom of the rail 132. These holes receive a locking stud 138, shown in FIG. 9. This locking stud 138 is of a known type including a threaded shaft 140 and a circular mushroom head 142.

A front locking disk 150 may be attached to the forward end 74 of the locking rod 70. As shown in FIG. 12, the front locking disk 150 is generally circular in shape and includes a locking flat 152. The front locking disk 152 is mounted to the locking rod 70 in an eccentric, upward-offset position. If desired, a tool recess (not shown) similar to the tool recess 80 described above may be formed in the front locking disk 150, to receive a tool for turning the locking rod 70 and the front locking disk 150. A flat boss 154 protrudes from the forward end 92 of the bottom rail 90.

The entire track fastener assembly 10, including all of the described component parts, may be constructed of any suitable material which will withstand the expected loads during use. In the illustrated example the track fastener assembly 10 is constructed of machined aluminum, except for the locking studs 50, 51, 52, and 138 which comprise a steel alloy.

The track fitting apparatus 10 fits together as follows. The aft end 76 of the locking rod 70 is installed into the rear slide 40 so that the pins 72 engage the helical groove 78. The locking rod 70 passes longitudinally under the overhanging lips 68 and is thus retained in the channel 60. The locking rod 70 and rear slide 40 combination is placed vertically downward into the base 20 so that the rail 46 fits down into the longitudinal slot 36 of the base 20, and the annular groove 82 in the forward end 74 of the locking rod 70 slides down into the vertical slot 32 between the flanges 30 of the bosses 26. The locking studs 50, 51, and 52 are screwed into the rear slide 40 from below. Thus assembled, the locking rod 70 may rotate and move a limited amount vertically with respect to the base 20, limited by the interference of the locking studs with the base 20, but may not move laterally or longitudinally to any substantial degree relative to the base 20. The forward end 74 of the locking rod 70 is installed into the front slide 116 so that the pins 130 engage the helical groove 78'. The locking rod 70 passes longitudinally under the overhanging lips 128 and is thus retained in the channel 124. The front slide 116 is received in the slide channel 98 of the bottom rail 90 and the base 20 is secured to the base rail 20 as described above. The forward end 74 of the locking rod 70 is received in a vertically-extending slot 91 in the forward end of the bottom rail 90

(see FIG. 10), which allows the locking rod 70 and front slide 116 to move vertically relative to the bottom rail 90. With the track fastener assembly 10 thus assembled, rotation of the locking rod 70 will thus cause the rear slide 40 to move forwards or backwards axially in the longitudinal slot 36, depending on the direction of rotation, and the front slide 116 to move forwards or backwards axially in the slide channel 98 in unison with the rear slide 40.

FIG. 4 illustrates the installation of the rear portion R of the track fastener assembly 10 in the locking track 11. It is noted that the cutting plane of the cross-sectional views of FIGS. 4 and 5 is offset from the true centerline of the track fastener assembly 10 so as to better show the operation of the locking rod 70 and rear slide 40. The track fastener assembly 10 (and any attached seating or cargo unit) is placed vertically downwards so that the locking studs 50, 51, and 52 pass through three adjacent enlarged openings 14 in locking track 11. The locking stud 138 of the front slide 116 also passes through an identical enlarged opening (not shown) in an axially forward portion of the locking track 11. In this position, the track fastener assembly 10 may be removed from the locking track 11 by simply lifting the track fastener assembly 10 vertically out of the track 11. Locking studs 50, 51, 52, and 138 are aligned with enlarged openings 14. The track stops 34 are engaged in one or more of the enlarged openings 14 and prevent lateral or longitudinal movement of the track fastener assembly 10 relative to the locking track 11. The rear locking disk 77 is oriented so that the locking flat 79 faces upward, away from the base 20.

Referring now to FIG. 5, the track fastener assembly 10 is locked into place as follows: While the track fastener assembly 10 is still positioned in the original location along the track 11, the locking rod 70 is rotated (clockwise in this example), using a suitable tool, such as an Allen-type wrench, not shown, engaged in the tool recess 80. As the locking rod 70 is turned, the helical groove 78 forces the pins 72, and thus the rear slide 40 with the attached locking studs 50, 51, and 52 to translate along the length of the base 20 towards the track stops 34, while the base 20 remains stationary. This motion is constrained laterally by the rail 46 of the rear slide 40 riding in the longitudinal slot 36 of the base 20. This longitudinal motion of the rear slide 40 causes the attached locking studs 50, 51, and 52 to move to a position under respective adjacent narrow track slot segments 15. Also, the front slide 116 with the attached locking stud 138 translates along the length of the slide channel 98 towards the forward end 74 of the locking rod 70, while the bottom rail 90 remains stationary. This longitudinal motion of the front slide 116 causes the attached locking stud 138 to move to a position under a respective adjacent narrow track slot segment (not shown). This prevents the withdrawal of the track fastener assembly 10 from the track 11 in a vertical direction.

At the same time, the shoulders 48 of the rear slide 40 engage the ramp 38 of the base 20. This forces the rear slide 40 upward, causing the locking studs 50, 51, and 52 to pull the base 20 down against the top surface of the track 11. Further rotation of the locking rod 70 causes the upper walls 13 of the track 11 to be tightly clamped between the locking studs 50, 51, and 52 and the base 20 such that the track fitting apparatus 10 is rigidly attached to the track 11. As the locking rod 70 and rear locking disk 77 are rotated, the peripheral edge of the rear locking disk 77 bears against the base 20, creating a camming motion which lifts up the aft end 76 of the locking rod 70 and brings the rear slide 40 into a level (or nearly level) position relative to the base 20. As the rear locking disk 77 is rotated to the fully locked position, the locking flat 79 engages the surface of the base 20. In this position, the rear locking disk 77 serves to resist rotation from the locked position, and visually indicate that the track fastener assembly 10 is locked.

As the locking rod 70 and front locking disk 150 are rotated, the peripheral edge of the front locking disk 150 bears against the boss 154, creating a camming motion which lifts up the forward end 74 of the locking rod 70 to bring the front slide 116 into a level (or nearly level) position relative to the base 20, pulls the locking stud 138 upwards, and firmly clamp the front end 92 of the bottom rail 90 to the track (not shown). As the front locking disk 150 is rotated to the fully locked position, the locking flat 154 engages the surface of the boss 154. In this position, the front locking disk 150 resists rotation from the locked position, and visually indicates that the track fastener assembly 10 is locked.

The axial motion of the rear slide 40 is limited by the rail 46 abutting the central pad 47 of the longitudinal slot 36 of the base 20. By limiting the axial motion in this manner, any galling or gouging of the walls of the longitudinal slot 36 by the corners of the rail 46 is prevented. Thus, the seat or cargo unit is securely locked in place, without having to move the track fastener assembly 10 relative to the track 11 once the initial positioning has been completed.

The track fastener assembly 10 can be moved from the installation (or unlocked) position to the locked position with a small amount of rotation, for example about 360 or 270 degrees, and preferably only about 180 degrees. It has been determined that a helical groove 78 (or 78') having a pitch sufficient to provide fully opened to fully locked movement within approximately 180 degrees of rotation, in conjunction with the proper location of the locking flats 79 and 152 of the front and rear locking disks 77 and 150, provides a proper balance of torque required to rotate the locking rod 70 and the number of turns between the locked and unlocked positions. Other configurations are possible for the helical grooves 78 and 78'. In addition, the number and spacing of the locking studs may be varied. Furthermore, it is equally possible that the moving components of the track fastener assembly 10 could be reversed. That is, the locking rod could be axially immovable relative to the front and rear slides 116 and 40 and axially movable relative to the base 20.

A track fastener assembly is described above. Various details of the invention may be changed without departing from its scope. Furthermore, the foregoing description of the preferred embodiment the invention and the best mode for practicing the invention are provided for the purpose of illustration only and not for the purpose of limitation—the invention being defined by the claims.

What is claimed is:

1. A track fastener assembly for use with a locking track of the type used to secure a seat or cargo apparatus to the floor of a vehicle, upper walls of said locking track defining a longitudinally-extending slot therein, upper walls of the slot having regularly spaced-apart enlarged openings along the length thereof separated by relatively narrower track segments defining locking segments, said track fastener assembly comprising:

(a) an elongated bottom rail having forward and aft ends, and an axially-extending slide channel disposed therein;

(b) an elongated base having forward and aft ends and including attachment means for attachment to said aft end of said bottom rail, said base having a longitudinal slot formed therein, at least one ramp disposed on an upper surface of said base adjacent a forward end of said longitudinal slot, and at least one downwardly-protruding track stop for engaging said enlarged openings of said track;

(c) a rear slide movably attached to said base, said rear slide including a first rail received in said longitudinal slot of said base and carrying at least one downwardly-protruding locking stud for engaging said track;

(d) a front slide slidably received in said slide channel, said front slide including a second rail received in said slide channel and carrying at least one additional downwardly-protruding locking stud for engaging said track; and (e) a generally horizontally extending locking rod having at least one helical groove formed in its outer surface, said locking rod being operatively connected to said bottom rail, said base, and said front and rear slides, such that rotation of said locking rod causes said front and rear slides and said locking studs to move longitudinally from an installation position to a locked position spaced away from said installation position.

2. A track fastener assembly according to claim 1, wherein each of said front and rear slides includes at least one pin which engages said helical groove of said locking rod for imparting horizontal movement to respective front and rear slides as said locking rod is rotated.

3. A track fastener assembly according to claim 1 whereby said locking rod may freely rotate and move vertically with respect to said base, but is restrained laterally and longitudinally relative to said base.

4. A track fastener assembly according to claim 1, wherein said helical groove is formed in said locking rod to move said front and rear slides between said installation position and said locked position in less than 360 degrees of rotation of said locking rod.

5. A track fastener assembly according to claim 1, further comprising an eccentric rear locking disk attached to an aft end of said locking rod, such that rotation of said locking rod causes a peripheral edge of said rear locking disk to bear against said base and lift said locking rod and said rear slide away from said base.

6. A track fastener assembly according to claim 5, wherein said rear locking disk includes a first locking flat disposed on said peripheral edge for engaging a surface of said base, such that rotation of said locking rod is resisted.

7. A track fastener assembly according to claim 6, wherein said first locking flat is positioned such that said first locking flat engages said base after approximately 180 degrees of rotation of said locking rod from said installation position.

8. A track fastener assembly according to claim 1, further comprising an eccentric front locking disk attached to a forward end of said locking rod, such that rotation of said locking rod causes a peripheral edge of said front locking disk to bear against a boss disposed on said bottom rail and lift said locking rod and said front slide upwards relative to said bottom rail.

9. A track fastener assembly according to claim 8, wherein said front locking disk includes a locking flat disposed on said peripheral edge for engaging said boss, such that rotation of said locking rod is resisted.

10. A track fastener assembly according to claim 9, wherein said locking flat is positioned such that said locking flat engages said base after approximately 180 degrees of rotation of said locking rod from said installation position.

11. A track fastener assembly according to claim 1, wherein said helical groove is formed in said locking rod to move said front and rear slides between said installation position and said locked position in approximately 180 degrees of rotation of said locking rod.

12. A track fastener assembly according to claim 1, wherein:

said first and second rails of said front and rear slides each include a pair of tapered surfaces flanked by a pair of angled shoulders;

said longitudinal slot includes a pair of sidewalls tapered opposite to said tapered surfaces of said first rail, and a beveled ledge;

said slide channel includes a pair of sidewalls tapered opposite to said tapered surfaces of said second rail, and a beveled ledge;

wherein said angled shoulders of said first rail mate with said beveled ledge of said longitudinal slot, and a gap is formed between said tapered surfaces of said first rail and said sidewalls of said longitudinal slot, so as to permit limited rotation of said rear slide relative to said base; and said angled shoulders of said second rail mate with said beveled ledge of said slide channel, and a gap is formed between said tapered surfaces of said second rail and said sidewalls of said slide channel, so as to permit limited rotation of said front slide relative to said bottom rail.

13. A track fastener assembly for use with a locking track of the type used to secure a seat or cargo apparatus to the floor of a vehicle, upper walls of said locking track defining a longitudinally-extending slot therein, upper walls of the slot having regularly spaced-apart enlarged openings along the length thereof separated by relatively narrower track segments defining locking segments, said track fastener assembly comprising:

(a) an elongated bottom rail having forward and aft ends, and an axially-extending slide channel disposed therein;

(b) an elongated base having forward and aft ends and including attachment means for attachment to a seat or cargo apparatus, said base having a longitudinal slot formed therein, at least one ramp disposed on an upper surface of said base adjacent a forward end of said longitudinal slot, and at least one downwardly-protruding track stop for engaging said enlarged openings of said track;

(c) a rear slide movably attached to said base, said rear slide including a bottom portion defining a first rail which is received in said longitudinal slot of said base, a pair of shoulders adjacent said rail, and an upper surface defining a first channel;

(d) a front slide movably attached to said bottom rail, said front slide including a bottom portion defining a second rail which is received in said slide channel a pair of shoulders adjacent said second rail, and an upper surface defining a second channel;

(e) at least one upstanding pin disposed in each of said first and second channels;

(f) at least one locking stud having an enlarged head attached to said first rail of said rear slide;

(g) at least one additional locking stud having an enlarged head attached to said second rail of said front slide;

(h) a locking rod having forward and aft ends and at least one helical groove formed in its outer surface, said locking rod being received in said channels of said front and rear slides such that said helical groove engages said pins in said first and second channels, said locking rod being rotatably attached to said base and said bottom rail;

wherein rotation of said locking rod causes said front and rear slides and said attached locking studs to move axially from an installation position to a locked position spaced away from installation position, and wherein said shoulders of said rear slide engage said ramp thereby deflecting said rear slide upwards in said locked position.

14. A track fastener assembly according to claim 13, wherein said locking rod includes a tool recess formed in one of said forward and aft ends thereof for engaging a tool for rotating said locking rod.

15. A track fastener assembly according to claim 13 wherein said track stop comprises a cylindrical protrusion.

16. A track fastener according to claim 13 wherein said track stop comprises a semi-cylindrical protrusion.

17. A track fastener assembly according to claim 13, wherein said helical groove is formed in said locking rod to move said front and rear slides between said installation position and said locked position in less than 360 degrees of rotation of said locking rod.

18. A track fastener assembly according to claim 13, further comprising an eccentric rear locking disk attached to said aft end of said locking rod, such that rotation of said locking rod causes a peripheral edge of said rear locking disk to bear against said base and lift said locking rod and said rear slide away from said base.

19. A track fastener assembly according to claim 18, wherein said rear locking disk includes a first locking flat disposed on said peripheral edge for engaging a surface of said base such that rotation of said locking rod is resisted.

20. A track fastener assembly according to claim 18, wherein said first locking flat is positioned such that said first locking flat engages said base after approximately 180 degrees of rotation of said locking rod from said installation position.

21. A track fastener assembly according to claim 13, further comprising an eccentric front locking disk attached to a forward end of said locking rod, such that rotation of said locking rod causes a peripheral edge of said front locking disk to bear against a boss disposed on said bottom rail and lift said locking rod and said front slide upwards relative to said bottom rail.

22. A track fastener assembly according to claim 21, wherein said front locking disk includes a locking flat disposed on said peripheral edge for engaging said boss such that rotation of said locking rod is resisted.

23. A track fastener assembly according to claim 22, wherein said locking flat is positioned such that said locking flat engages said base after approximately 180 degrees of rotation of said locking rod from said installation position.

24. A track fastener assembly according to claim 13, wherein said helical groove is formed in said locking rod to move said front and rear slides between said installation position and said locked position in approximately 180 degrees of rotation of said locking rod.

25. A track fastener assembly according to claim 13, wherein:
said first and second rails of said front and rear slides each include a pair of tapered surfaces flanked by a said respective pair of shoulders;
said longitudinal slot includes a pair of sidewalls tapered opposite to said tapered surfaces of said first rail, and a beveled ledge;
said slide channel includes a pair of sidewalls tapered opposite to said tapered surfaces of said second rail, and a beveled ledge;
wherein said angled shoulders of said first rail mate with said beveled ledge of said longitudinal slot, and a gap is formed between said tapered surfaces of said first rail and said sidewalls of said longitudinal slot, so as to permit limited rotation of said rear slide relative to said base; and
said angled shoulders of said second rail mate with said beveled ledge of said slide channel, and a gap is formed between said tapered surfaces of said second rail and said sidewalls of said slide channel, so as to permit limited rotation of said front slide relative to said bottom rail.

26. A track fastener assembly according to claim 13, wherein said attachment means comprises a pair of upstanding spaced-apart bosses having a pair of aligned openings formed therein, and said bosses include a pair of flanges defining a vertical slot therebetween.

27. A track fastener assembly according to claim 26, wherein said locking rod has an annular groove formed near its forward end, said annular groove being received in said vertical slot between said bosses whereby said locking rod may freely rotate and move vertically with respect to said base, but is restrained laterally and longitudinally relative to said base.

* * * * *

UNITED STATES PATENT AND TRADEMARK OFFICE
CERTIFICATE OF CORRECTION

| | | |
|---|---|---|
| PATENT NO. | : 7,029,215 B2 | Page 1 of 1 |
| APPLICATION NO. | : 10/866288 | |
| DATED | : April 18, 2006 | |
| INVENTOR(S) | : Mark Brian Dowty | |

It is certified that error appears in the above-identified patent and that said Letters Patent is hereby corrected as shown below:

Column 12,
Line 52, insert a comma after "channel".

Signed and Sealed this

Twentieth Day of June, 2006

JON W. DUDAS
*Director of the United States Patent and Trademark Office*